United States Patent [19]

Peters

[11] Patent Number: 4,765,449

[45] Date of Patent: Aug. 23, 1988

[54] PRESS-IN REVERSING KNOB

[76] Inventor: Gerald Peters, 269 Hawthorne, Elyria, Ohio 44035

[21] Appl. No.: 860,325

[22] Filed: May 6, 1986

[51] Int. Cl.⁴ .................... F16D 41/16; B25B 13/46
[52] U.S. Cl. ..................... 192/43.1; 16/DIG. 30; 81/62; 81/63.1
[58] Field of Search ............ 192/43, 43.1, 43.2, 192/44; 81/62, 63, 63.1, 63.2; 16/121, DIG. 30, DIG. 40; 74/553

[56] References Cited

U.S. PATENT DOCUMENTS

| | | | |
|---|---|---|---|
| 959,690 | 5/1910 | Anderson | 81/62 |
| 2,139,650 | 12/1938 | Anderson et al. | 192/44 |
| 2,188,846 | 1/1940 | Rueb | 81/63 |
| 2,706,424 | 4/1955 | Johnson | 81/63 |
| 2,706,774 | 4/1955 | Bowman | 16/121 |
| 3,044,591 | 7/1962 | Kilness | 192/43.1 |
| 3,290,969 | 12/1966 | Bergquist et al. | 81/63.1 |
| 3,372,612 | 3/1968 | Rozmus | 81/62 |
| 3,393,587 | 7/1968 | Jolliff et al. | 81/63.2 |
| 3,438,291 | 4/1969 | Bergquist | 81/62 |
| 3,503,586 | 3/1970 | Bordes | 74/553 |
| 4,052,768 | 10/1977 | Yamazaki et al. | 16/121 |
| 4,307,632 | 12/1981 | Penner | 81/63 |
| 4,520,697 | 6/1985 | Moetteli | 81/62 |

Primary Examiner—Rodney H. Bonck
Assistant Examiner—David A. Testardi
Attorney, Agent, or Firm—Baldwin, Egan & Fetzer

[57] ABSTRACT

A press-in reversing knob for a ratchet wrench which has a self-contained retaining means. The reversing knob includes a generally cylindrical member having an annular flange at its upper end and resilient inwardly-deformable projections extending radially outward from its lower end. A cylindrical bore formed in the plug includes a coaxial annular retaining groove spaced downwardly from the top of the bore. As the reversing knob is pressed into the bore, the resilient projection is deformed inwardly by the walls of the bore until the projection engages the retaining groove and springs outwardly. The retaining groove retains the projection to prevent the reversing knob from becoming upwardly disengaged from the bore while accommodating rotational movement of the projection as the reversing knob is turned.

13 Claims, 4 Drawing Sheets

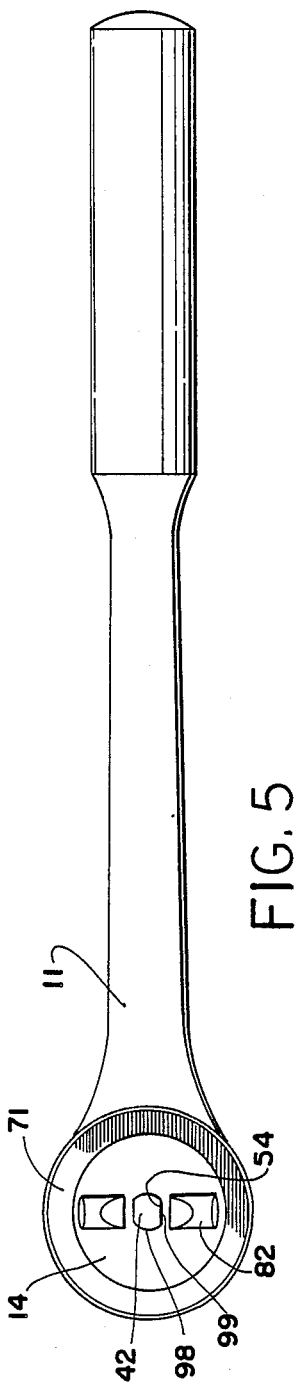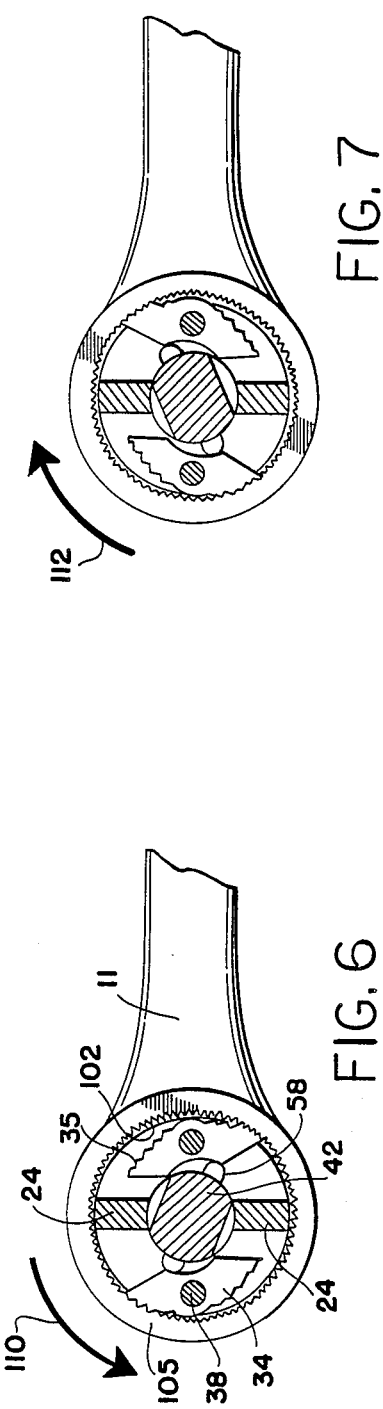

PRESS-IN REVERSING KNOB

TECHNICAL FIELD

The present invention relates generally to ratchet wrenches, and relates more specifically to a press-in reversing knob for a ratchet wrench which has a self-contained retaining means.

BACKGROUND OF THE INVENTION

Reversible ratchet wrenches are well known in the art. Typically, such ratchet wrenches include a plug having a drive shaft formed on its lower end. A pawl having teeth in both ends is pivotably mounted to the plug. The pawls are mounted to engage ratchet teeth formed on the inner surface of a bore in the wrench handle into which the plug assembly is received. A pellet slideably mounted in a pivoting stem urges a first end of the pawl into engagement with the teeth of the ratchet, permitting the plug to rotate in only one direction. Upon actuation of a reversing knob, the stem and pellet pivot, causing the pawl to pivot, disengaging the first end of the pawl from the ratchet and urging the opposite end of the pawl into engagement with the ratchet, thereby permitting the plug to rotate only in the opposite direction.

One of the design requirements of these reversible ratchet wrenches is that the reversing knob be securely retained for rotational movement within a bore in the ratchet plug assembly. Prior art ratchet wrenches typically employ a separate circular clip for retaining the reversing knob within the ratchet plug. However, these designs suffer the disadvantages of the cost and inventory of an extra part, more difficult and time-consuming assembly, and assembly problems frequently resulting in jamming. To assemble such a reversing knob with a separate retaining clip, the clip must first be fed into the bore in the plug until it snaps into a retaining groove. The retaining clip must then be centered within the bore while the reversing knob is fed into the bore and through the clip. If the retaining clip is not perfectly centered within the retaining groove, the end of the reversing knob will force the clip out of the retaining groove, and the clip will jam between the knob and the wall of the bore below the retaining groove. In certain cases, the jamming may be so severe that it cannot be corrected, and the entire assembly will have to be discarded.

Thus, there is a need to provide a means for retaining a reversing knob within the bore of the plug of a reversible ratchet wrench which is easy to assemble and avoids the cost and problems associated with a separate retaining clip.

SUMMARY OF THE INVENTION

As will be seen, the present invention overcomes these and other problems associated with prior art designs for retaining the reversing knob within the bore of the plug of a reversible ratchet wrench. Stated generally, the present design comprises a reversing knob for a ratchet wrench which has a self-contained retaining means. The design requires no separate parts and provides for ease and speed of assembly while positively retaining the reversing knob for rotational movement within the plug.

Stated more specifically, the reversing knob of the present invention includes a generally cylindrical member having an annular flange at the upper end thereof and resilient inwardly-deformable tabs extending radially outwardly from its lower end. A cylindrical bore formed in the plug is dimensioned to receive the cylindrical member of the reversing knob but not the annular flange, and includes a coaxial annular retaining groove spaced downwardly from the top of the bore. As the reversing knob is pressed into the bore, the resilient tabs are deformed inwardly by the walls of the bore until the tabs engage the retaining groove and spring outwardly. The retaining groove retains the tabs to prevent the reversing knob from becoming upwardly disengaged from the bore while accommodating rotational movement of the tabs as the reversing knob is turned.

Thus, it is an object of the present invention to provide a means for securing a reversing knob which requires no separate parts.

It is a further object of the present invention to provide a reversing knob which can easily and quickly be assembled into the plug of a ratchet wrench.

Other objects, features, and advantages of the present invention will become apparent upon reading the following specification when taken in conjunction with the drawing and the appended claims.

BRIEF DESCRIPTION OF THE DRAWINGS

FIG. 5 is a top view of the ratchet wrench of FIG. 1.

FIGS. 6 and 7 are top views of the ratchet wrench of FIG. 1 with the plug assembly cut away along lines 6—6 of FIG. 4.

DETAILED DESCRIPTION OF THE DISCLOSED EMBODIMENT

Figure 1:
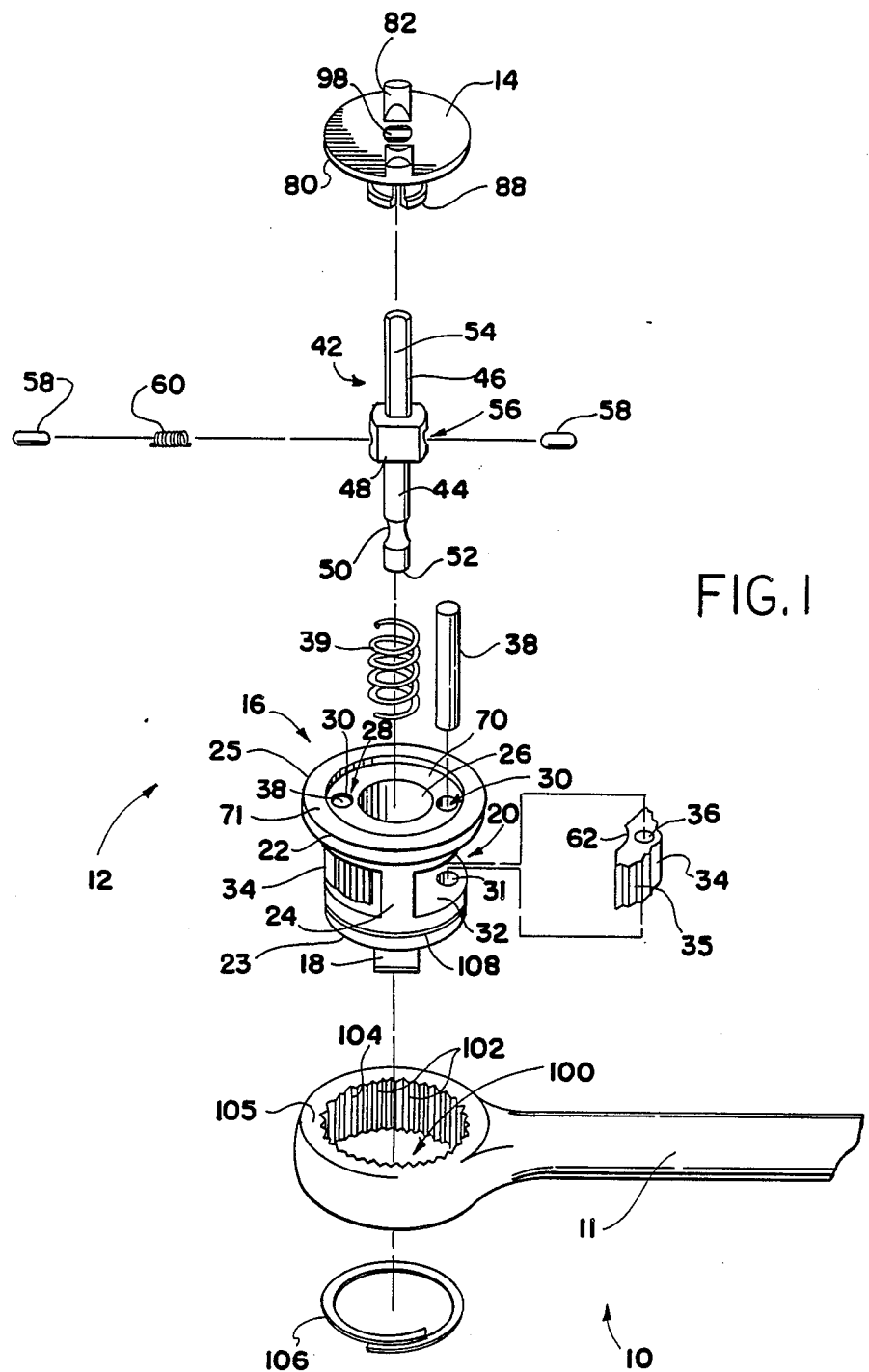
FIG. 1 shows an exploded perspective view of a ratchet wrench including the plug assembly and press-in reversing knob of the present invention.

Referring now in more detail to the drawing, in which like numerals indicate like elements throughout the several views, FIG. 1 shows a reversible ratchet wrench 10 including a wrench handle 11 and a plug assembly 12 having a press-in reversing knob 14 according to the present invention. The plug assembly 12 includes a plug 16 having a square drive member 18 formed in the lower end thereof. The plug 16 is generally cylindrical and has a pair of opposing recesses 20 which divide the plug into an upper portion 22 and a lower portion 23 connected by vertical posts 24. An annular flange 25 is formed at the upper end of the plug 16.

Figure 4:
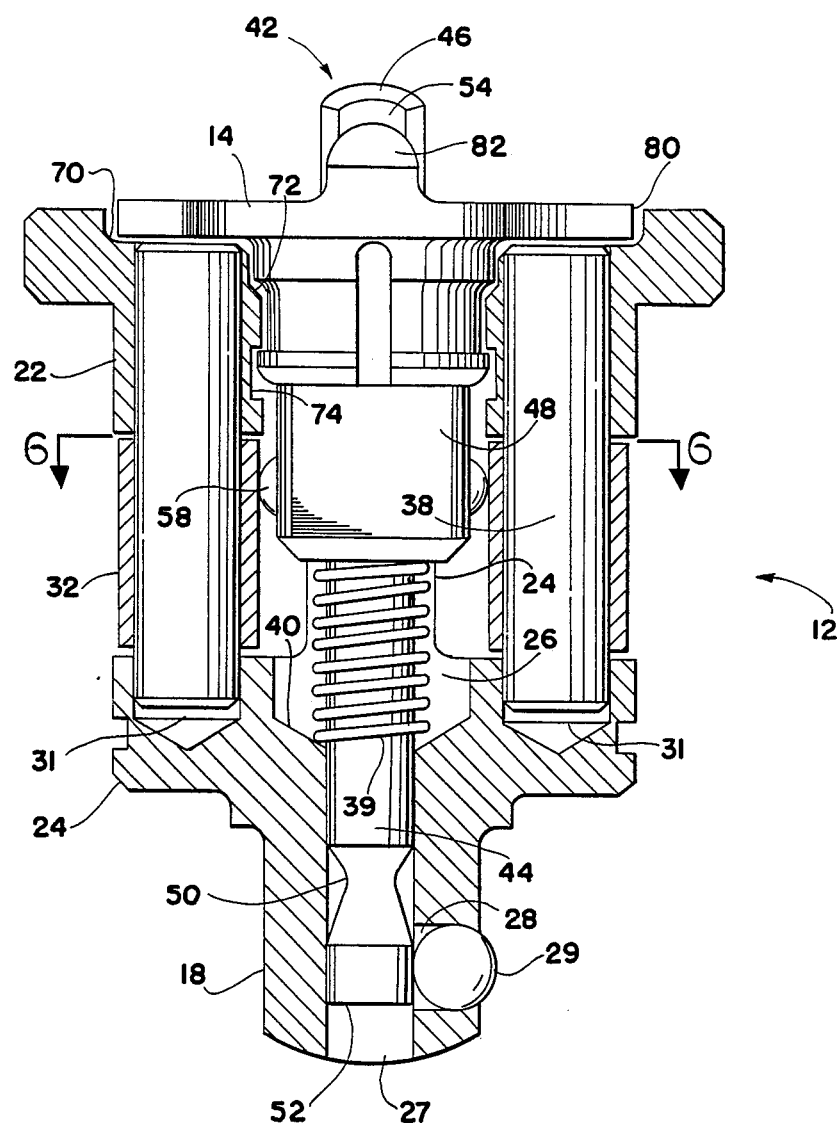
FIG. 4 is a partially cut-away side view of the plug assembly of FIG. 1.

The plug 16 further includes a generally cylindrical bore 26 formed through the upper portion 22 of the plug and partially through the lower portion 23. As shown in FIG. 4, a bore 27 of smaller diameter than the bore 26 and coaxial therewith is formed through the remainder of the lower portion 23 of the plug. Transverse to the bore 27 and in communication therewith is a substantially frustoconically-shaped port 28 within which is received a ball bearing 29. The outer edge of the ball bearing 29 protrudes exteriorly of the square drive member 18 to frictionally engage a wrench socket (not shown) to maintain the socket in engagement with the drive member.

Referring again to FIG. 1, outwardly of the bore 26 and parallel thereto are a pair of bores 30 formed through the upper portion 22 of the plug 16. A pair of corresponding dimples 31 coaxial with the bores 30 are formed in the upper surface 32 of the lower portion 23 of the plug.

Pawls 34 having teeth 35 formed in opposing ends are received within the opposing recesses 20, and a corresponding vertical hole 36 formed in each pawl 34 aligns with the bores 30 formed in the plug 16. Pivot pins 38 are then inserted through the bores 30 in the upper portion 22 of the plug, through the holes 36 in the pawls 34, and into engagement with the dimples 31 in the upper surface 32 of the lower portion 23 of the plug. The pivot pins 38 secure the pawls 34 for rotational movement within the recesses 20 of the plug.

A coil spring 39 is dimensioned to be received through the bore 26 but not through the bore 27. When installed into the plug 16, the coil spring 39 bears against the bottom wall 40 of the bore 26 as shown in FIG. 4, which bottom wall surrounds the upper end of the bore 27.

An elongated stem 42 has a lower portion 44, an upper portion 46, and a central portion 48. The lower portion 44 of the stem includes an annular recess 50 formed proximate its lower end 52. The upper portion 46 of the stem has opposing flattened sides 54. A transverse bore 56 formed in the central portion 48 of the stem 42 receives a pair of pellets 58 with a coil spring 60 interposed therebetween to urge the pellets outwardly. When assembled, the pellets 58 bear against backs 62 of the pawls 34 in a manner more particularly described below to reverse the ratcheting action of the wrench. The stem 42 is received within the bore 26 with the lower portion 44 of the stem being received through the coil spring 39 and within the bore 27. The upper end of the coil spring 39 bears against the lower edge of the central portion 48 of the stem 42 to bias the stem upwardly.

Figure 2:
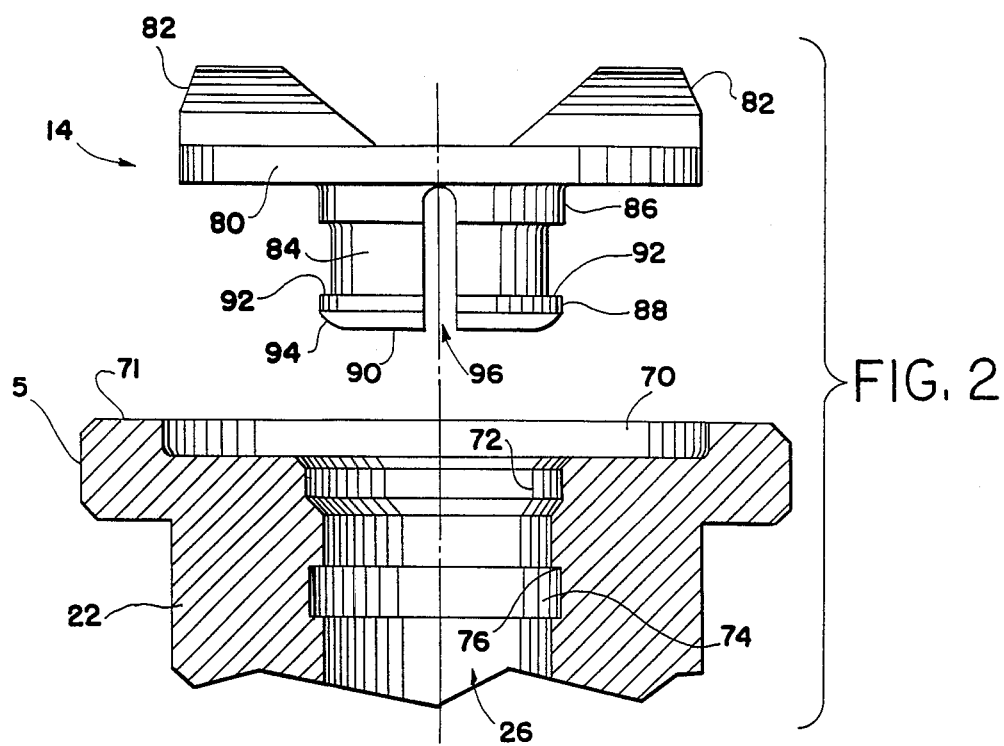
FIG. 2 is a partial cut-away side view of the reversing knob and plug of FIG. 1.

Referring now to FIG. 2, the upper portion 22 of the plug 16 includes a circular recess 70 formed in the upper surface 71 of the plug coaxial with the bore 26, and an annular recess 72 formed at the upper end of the bore. Spaced downwardly from the upper end of the bore is a retaining groove 74 formed outwardly of the bore and in communication therewith. The retaining groove 74 defines a shoulder 76 at its upper end extending radially outwardly from the bore 26.

Figure 3:
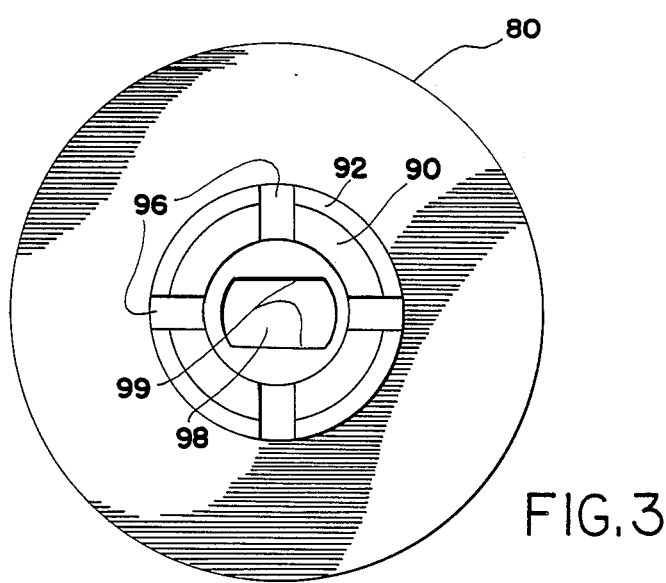
FIG. 3 is a bottom view of the reversing knob of FIG. 1.

Further referring to FIG. 2, the improved reversing knob 14 of the present invention includes an annular flange 80 at its upper end dimensioned to be received within the circular recess 70 in the upper surface 71 of the plug 16. Knobs 82 formed atop the annular flange provide a means by which the reversing knob can be turned. A generally cylindrical member 84 formed at the lower end of the reversing knob includes a bearing surface 86 dimensioned to be received within the annular recess 72 formed at the upper end of the bore 26. A plurality of inwardly deformable tabs 88 extend radially from the lower edge 90 of the cylindrical member. Each tab 88 includes an upper edge 92 and a leading cam surface 94 formed at the lower edge. A plurality of interruptions 96 through the wall of the cylindrical member 84 between adjacent tabs facilitate inward deformation. Finally, as shown in FIG. 3, an elongated vertical hole 98 having opposing flat sides 99 is formed in the reversing knob 14 and is dimensioned to receive the upper end 46 of the stem 42 therethrough.

Referring again to FIG. 1, the wrench handle 11 includes a generally cylindrical bore 100 having ratchet teeth 102 formed on its inner surface 104. The bore 100 is dimensioned to receive the plug assembly 12, the annular flange 25 of the plug 16 bearing against an upper surface 105 of the wrench handle 11. A retaining ring 106 engages a groove 108 formed in the lower section 44 of the plug 42 to retain the plug for rotational movement within the bore.

To assemble the plug assembly 12 including the improved reversing knob 14 of the present invention, the ball bearing 29 is first inserted into its transverse port 28 within the drive member 18 of the plug 14. With the coil spring 39 inserted over the lower portion 44 of the stem 42, the stem is inserted downwardly into the bores 26 and 27 until the lower end of the spring rests against the bottom wall 40 of the bore 26. With the stem thus installed, the lower portion 44 of the stem bears against the ball bearing 29 to urge it outwardly within its port 28. When the top portion 46 of the stem is pressed downwardly, the annular recess 50 proximate the lower end 52 of the stem is disposed adjacent the port 28, permitting the ball bearing 29 to be displaced inwardly toward the stem. In this manner, wrench sockets mounted to the drive member 18 are frictionally engaged by the portion of the bearing protruding outwardly of the drive member and are held in place until released by downward pressure on the stem, in the manner well known to those skilled in the art.

With the pellets 58 and coil spring 60 mounted in the transverse bore 56 in the central section 48 of the stem 42, the pawls 34 are positioned in the recesses 20 on either side of the plug 16. The pivot pins 38 are then inserted downwardly into the bores 30 and downwardly through the corresponding hole 36 in the pawls 34 and into the dimples 31 formed in the upper surface 32 of the lower section 23 of the plug 16.

The reversing knob 14 is now assembled into the upper portion 46 of the plug 16. The upper end 46 of the stem 42 is received through the hole 98 in the reversing knob 14. As the lower edge 90 of the knob is inserted into the bore 26 in the plug, the leading cam surface 94 formed at the lower edge of the tabs 88 bears against the walls of the bore, deforming the tabs inwardly. As the reversing knob is pressed further into the bore, the tabs 88 engage the retaining groove 74 and resile outwardly so that the upper edges 92 of the tabs engage the shoulder 76. The upper edge of the central portion 48 of the stem 42 bears upwardly against the the lower edge 90 of the reversing knob 14 in response to the upward pressure exerted by the coil spring 39. Thus, the upper edges 94 of the tabs 88 are held firmly against the shoulder 76 formed by the upper wall of the retaining groove 74. The reversing knob 14 thus cannot become upwardly disengaged from the plug 16 because of the tabs 88 engaging the retaining groove 74, and the reversing knob cannot become downwardly disengaged from the plug because of the annular flange 80 bearing against the recess 70 in the upper surface of the plug.

With the reversing knob thus installed, the opposing flat sides 54 of the upper portion 46 of the stem 42 engage the flat sides 99 of the hole 98 in the reversing knob such that turning the reversing knob rotates the stem. The stem 42 is retained within the plug by the lower end 90 of the retaining knob 14 bearing against the upper edge of the central portion 48 of the stem. The pawls 34 are retained within the recesses 20 by the annular flange 80 of the reversing knob 14 preventing the pivot pins 38 from being withdrawn upwardly from their bores 30.

With the plug assembly 12 thus assembled, the plug assembly is inserted into the bore 100 in the end of the wrench handle 11 until the annular flange 25 of the plug 16 bears against the upper surface 105 of the wrench handle. The retaining ring 106 is slipped over the lower end 23 of the plug protruding through the wrench handle to engage the groove 108. The plug assembly is thus securely retained for rotational movement within the bore in the wrench handle.

Referring now to FIGS. 6 and 7, the pellets 58 urged outwardly by their coiled spring 60 bear against a first end of each of the pawls 34, urging the teeth 35 on that first end of the pawls into engagement with the gear teeth 102 formed on the inner surface 104 of the bore 100 in the wrench handle 11. With the pawls thus engaged, the plug is free to turn in the direction indicated by the arrow 110 but is restrained from rotating in the opposite direction by the teeth 35 of the pawls 34 engaging the ratchet teeth 102.

To reverse the ratchet, the reversing knob (not shown in FIGS. 6 and 7) is turned counterclockwise so that the stem 42 and pellets 58 pivot to the position shown in FIG. 7. Although firmly retained within the plug 16 as described above, the reversing knob can be freely turned within the plug, with the tabs 88 moving along the shoulder 76 of the annular recess 74. As the stem and pellets pivot, the pawls 34 are caused to pivot upon their pivot pins 38, disengaging the first end of the pawls from the ratchet teeth 102 and urging the opposite end of the pawls into engagement with the ratchet. With the pawls thus engaged, the plug is permitted to turn only in the opposite direction, as indicated by the arrow 112, but is restrained from turning in the opposite direction by the pawls engaging the ratchet teeth.

It should be understood that the terms "upper", "lower", "above", "below", and the like are used herein only for convenience of description and do not limit the invention to any particular orientation of a ratchet wrench embodying the invention.

From the foregoing description, it will now be seen that the present invention provides a reversing knob which requires no separate parts to secure it for rotational movement within the plug assembly of a ratchet wrench, while providing for ease and speed of assembly.

Finally, it will be understood that the preferred embodiment of the present invention has been disclosed by way of example, and that other modifications may occur to those skilled in the art without departing from the scope and spirit of the appended claims.

What is claimed is:

1. In a reversible ratchet wrench having handle means carrying a drive shaft to which a socket wrench may be attached, ratchet means disposed in said handle means being operable to drivingly connect said handle means to said drive shaft and including a reversing knob cooperating with said ratchet means to reverse a driving direction having a member receivable for rotational movement within a plug in said wrench, the improvement comprising:

a flange projecting radially outwardly from the upper end of said member;

displaceable projection means formed as one piece with said member and projecting radially outwardly from a point on said member spaced below said flange;

means defining in said plug a cylindrical bore having upper and lower ends, said bore being dimensioned to receive said member but not said flange for rotational movement therein;

means defining a shoulder extending radially outwardly from the lower end of said cylindrical bore; and means operatively associated with said projection means as the lower end of said member is inserted past said shoulder for displacing said projection means outwardly to engage said shoulder to prevent said projection means from being retracted upwardly therefrom, said projection means being received for rotational movement along said shoulder;

whereby said knob is secured against becoming upwardly disengaged from said plug by said projection means engaging said shoulder, and against becoming downwardly disengaged from said plug by said flange bearing against said means defining the upper end of said bore.

2. The improvement of claim 1 wherein said displaceable projection means comprises a plurality of tabs formed around the circumference of said member.

3. The improvement of claim 2, further comprising means defining interruptions in said member between adjacent tabs to facilitate displacement of said tabs.

4. The apparatus of claim 1, wherein said bore has a depth approximately equal to the distance along said member between said flange and said projection.

5. In a reversible ratchet wrench having handle means carrying a drive shaft to which a socket wrench may be attached, ratchet means disposed in said handle means being operable to drivingly connect said handle means to said drive shaft and including a reversing knob cooperating with said ratchet means to reverse a driving direction having a member receivable for rotational movement within a plug in said wrench, the improvement comprising:

a flange projecting radially outwardly from the upper end of said member;

inwardly deformable resilient projection means formed as one piece with said member and projecting radially outwardly from a point on said member spaced below said flange;

means defining in said plug a cylindrical bore having upper and lower ends, said bore being dimensioned to receive said member but not said flange for rotational movement therein;

means operatively associated with said resilient projection means for deforming said projection means inwardly as said member is inserted into said bore; and means defining a shoulder extending radially outwardly from the lower end of said cylindrical bore such that as said member is inserted further into said bore said lower end of said member projects from the lower end of said cylindrical bore and said deformed projection means resiles to engage said shoulder to prevent said projection means from being retracted upwardly therefrom, said projection means further being received for rotational movement along said shoulder;

whereby said knob is secured against becoming upwardly disengaged from said plug by said projection means engaging said shoulder, and against becoming downwardly disengaged from said plug by said flange bearing against said means defining the upper end of said bore.

6. The apparatus of claim 5, wherein said means operatively associated with said resilient projection means for deforming said projection means inwardly as said member is inserted into said bore comprises a leading cam surface formed at the lower edge of said inwardly deformable resilient projection means which bears against said means defining said cylindrical bore to deform said projection means inwardly as said member is inserted downwardly into said cylindrical bore.

7. The improvement of claim 5, wherein said inwardly deformable resilient projection means comprises a plurality of inwardly deformable resilient tabs formed around the circumference of said member.

8. The improvement of claim 7, further comprising means defining interruptions in said member between adjacent tabs to facilitate displacement of said tabs.

9. The improvement of claim 5, wherein said bore has a depth approximately equal to the distance along said member between said flange and said projection means.

10. In a reversible ratchet wrench having handle means carrying a drive shaft to which a socket wrench may be attached, ratchet means disposed in said handle means being operable to drivingly connect said handle means to said drive shaft and including a reversing knob cooperating with said ratchet means to reverse a driving direction having a generally cylindrical member receivable for rotational movement within a plug in said wrench, the improvement comprising:

a flange projecting radially outwardly from the upper end of said cylindrical member;

an inwardly deformable resilient projection means formed as one piece with said member and projecting radially outwardly from a point on said cylindrical member spaced below said flange;

means defining in said plug a cylindrical bore having an upper end, said bore being dimensioned to receive said cylindrical member but not said flange for rotational movement therein;

means operatively associated with said resilient projection means for deforming said projection means inwardly as said cylindrical member is inserted into said bore; and means defining a retaining groove formed outwardly of and in communication with said cylindrical bore and spaced downwardly from the upper end thereof by an amount approximately equal to the height of said cylindrical member between said flange and said projection means, such that as said cylindrical member is inserted further into said bore said deformed resilient projection means is introduced into said retaining groove and resiles to engage said retaining groove to prevent said projection means from being retracted upwardly therefrom, said projection means further being received for rotational movement in said retaining groove;

whereby said knob is secured against becoming upwardly disengaged from said plug by said projection means engaging said retaining groove, and against becoming downwardly disengaged from said plug by said flange bearing against said means defining the upper end of said bore.

11. The apparatus of claim 10, wherein said means operatively associated with said resilient projection means for deforming said projection means inwardly as said member is inserted into said bore comprises a leading cam surface formed at the lower edge of said inwardly deformable resilient projection means which bears against said means defining said cylindrical bore to deform said projection means inwardly as said member is inserted downwardly into said cylindrical bore.

12. The improvement of claim 10, wherein said inwardly deformable resilient projection means comprises a plurality of inwardly deformable resilient tabs formed around the circumference of said cylindrical member.

13. The improvement of claim 12, further comprising means defining interruptions in said cylindrical member between adjacent tabs to facilitate displacement of said tabs.

* * * * *